H. C. KNOWLES.
ANTIFRICTION BEARING.
APPLICATION FILED MAY 15, 1919.
1,416,838.
Patented May 23, 1922.
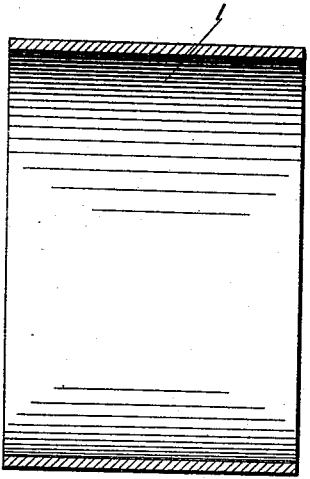
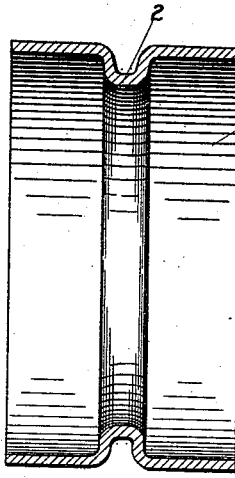
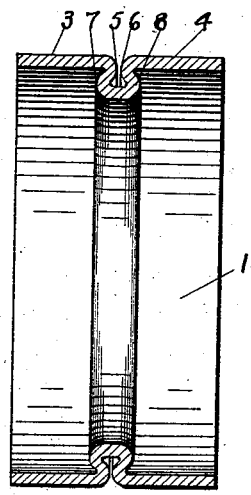
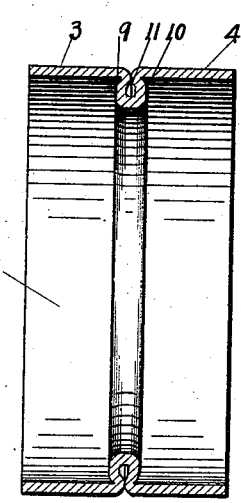
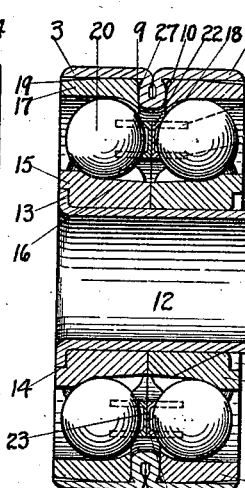
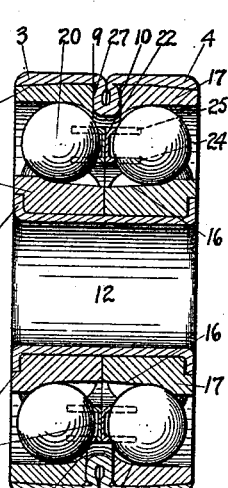
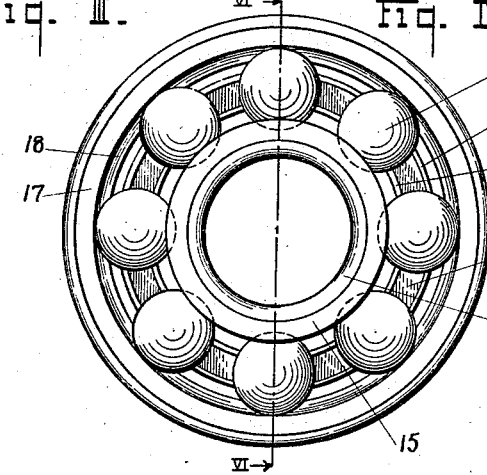
INVENTOR.
Harford C. Knowles
BY Chester W. Braselton
ATTORNEY

UNITED STATES PATENT OFFICE.

HARFORD C. KNOWLES, OF ELMIRA, NEW YORK, ASSIGNOR TO THE WILLYS-MORROW COMPANY, OF ELMIRA, NEW YORK, A CORPORATION OF OHIO.

ANTIFRICTION BEARING.

1,416,838.

Specification of Letters Patent.  Patented May 23, 1922.

Application filed May 15, 1919. Serial No. 297,416.

*To all whom it may concern:*

Be it known that I, HARFORD C. KNOWLES, residing at Elmira, county of Chemung, and State of New York, have invented certain new and useful Improvements in Antifriction Bearings, of which I declare the following to be a full, clear, and exact description.

This invention relates to anti-friction bearings and the process of making the same, being particularly directed to an improved form of casing and an improved process of forming the same from a cylindrical metal blank.

In the construction of anti-friction bearings provided with two rows of anti-friction elements, it has been found to be desirable in order to provide a structure capable of being readily assembled to employ a casing member for supporting the outer bearing members and retaining them in position relative to each other and to the inner bearing. The form of casing illustrated herewith is found to be capable of properly supporting the several parts of the anti-friction bearing in position relative to each other in a proper and efficient manner, and may be readily and easily constructed.

One object of the invention is to provide an improved process for forming the casing member from a metal blank.

A further object of the invention is to provide an improved casing member of the character described, which is of simple construction and efficient in operation.

A further object of the invention is to provide an improved form of anti-friction bearing wherein a casing member of the character described cooperates with the several bearing elements to produce a compact and efficient structure capable of efficient operation under various conditions of use.

Further objects of the invention relate to economies of manufacture and details of construction, as will hereinafter appear from the detailed description to follow.

The objects of the invention are accomplished in one instance by the devices and means described in the following specification, but it is evident that the same may be varied widely without departing from the scope of the invention as pointed out in the appended claims.

A structure constituting one embodiment of the invention, which may be the preferred, is illustrated in the accompanying drawing forming a part hereof, in which:

Fig. I is a longitudinal, sectional view of a cylindrical metal blank from which the casing member is formed.

Fig. II is a longitudinal, sectional view of the blank illustrated in Fig. I, after the completion of the first operation whereby an annular depression is formed in the metal blank circumferentially thereof.

Fig. III is a longitudinal, sectional view of the casing member illustrating the form thereof after the completion of the second operation which consists in forcing the outer cylindrical portions of the metal blank inwardly in such a manner as to bring the inner side walls of the depressed portion into proximity with each other.

Fig. IV is a longitudinal, sectional view of the casing member illustrating the position of the several parts after the completion of the final step of forming the same.

Fig. V is a longitudinal, sectional view of the completed bearing, prior to the pressing outwardly of the end portion of the inner tubular member and the forcing inwardly of the outwardly extending portions of the casing member.

Fig. VI is a longitudinal-sectional view of the completed bearing, taken along the line VI—VI of Fig. VII.

Fig. VII is an end elevational view of the completed bearing.

Referring to the drawing, similar reference characters designate corresponding parts throughout the several views, and the sectional view is taken looking in the direction of the small arrows at the ends of the section line.

In the embodiment of the invention illustrated herewith, 1 indicates a sheet metal blank of cylindrical form prior to the same being operated upon to form the casing member. In forming the casing member from the sheet metal blank 1, the blank is first subjected to pressure along a line substantially midway between the opposite ends thereof, and in a direction at substantially right angles to the longitudinal axis, so as to form an annular depression 2 therein, whereby the material of the depressed portion is forced inwardly from the cylindrical surface of the blank. After the forming of the annular depressed portion in the circular blank, the blank is preferably subjected to pressure in such a manner as to force the outwardly extending cylindrical portions 3 and 4 thereof inwardly to such an extent as to bring the inner edges 5 and 6 of the side walls of the depressed portion into proximity to each other so that the annular depressed portion will form in effect an annular rib extending inwardly from the cylindrical surface of the casing member. The blank thus formed is then subjected to pressure in such a manner as to flatten the outer faces 7 and 8 of the side walls of the depressed portion to provide flattened surfaces 9 and 10 thereon and bring the inner edges 5 and 6 of the side walls of the depressed portion into contact with each other throughout a portion of their extent as indicated at 11. The casing member thus formed comprises outwardly extending cylindrical portions 3 and 4, and an inwardly extending annular depressed or bent portion having the outer faces of its side walls flattened in such a manner as to provide supporting seats for the outer bearing members.

The anti-friction bearing comprises an inner tubular sleeve portion 12 having formed upon one end thereof an outwardly extending annular flange 13 which is adapted to fit within a groove 14 formed upon the outer end portion of one of a pair of inner bearing members 15, the two inner bearing members 15 constituting an inner bearing. Each of the inner bearing members 15 is provided with a curved, inclined outer surface 16, the two inclined outer surfaces 16 being formed in such a manner that when the inner bearings are in assembled position the curved inclined surfaces slope inwardly towards the transverse center of the bearing. Positioned outwardly of each of the inner bearing members 15 is an outer bearing member 17 provided with a curved inclined inner surface 18, and an inclined outer surface 19. The curved inner surface 18 of each outer bearing members slopes in the opposite direction from the curved inclined outer surface 16 of the opposed inner bearing member, and a plurality of balls or anti-friction elements 20 are interposed between the opposed inner and outer bearing members, being positioned in such a manner as to bear against the oppositely sloping curved inclined surfaces 16 and 18 of the two bearing members.

A pair of ball retainers or cages 22 of similar construction are positioned between the two rows of anti-friction elements in such a manner that each retainer cooperates with the anti-friction elements of one row for the purpose of properly spacing the anti-friction elements from each other and maintaining them in proper position relative to the other bearing elements. Each of these retainers 22 is provided with a base portion 23 of annular form, and has a plurality of inner and outer prongs 24 and 25 projecting therefrom at substantially right angles to the base portion 23, the prongs 24 and 25 being spaced from each other circumferentially of the base portion 23 in such a manner as to provide spaces for the reception of the anti-friction elements between the adjacent prongs of each series. The base portion 23 of the retainer rings bear against each other and serve to mutually support each other in proper position relative to the two rows of anti-friction elements for permitting relative rotation of one of the rows of anti-friction elements with respect to the other.

The outer bearing members are positioned within the casing member in such a manner that the outer inclined surface 19 of each of the outer bearing members extends in the direction of the corresponding outwardly extending cylindrical portion of the casing member, and the inner edge 27 of each of the outer bearing members rests against and is supported by one of the flattened faces 9 and 10 of the depressed portion of the casing.

In assembling the various elements comprising the anti-friction bearing, one of the inner bearing members 15 is first slipped over the inner tubular member 12 in such a manner that the outwardly extending flange 13 is positioned within the groove 14 formed in the bearing member whereupon the anti-friction elements comprising the race cooperating with the inner bearing member are positioned there-around and the opposed outer bearing member 17 cooperating with the first named inner bearing member is slipped over the anti-friction elements and the retainer ring cooperating therewith is placed in position.

The outer casing member is then placed in position with one of its outwardly extending cylindrical portions overlying the outer bearing member and the second outer bearing member is placed in position within the other outwardly extending cylindrical portion of the casing. The second retainer ring is then placed upon the first retainer ring and the anti-friction elements forming the second race are placed in position thereupon whereupon the second inner bearing member is inserted between the second row of anti-friction members and the tubular sleeve 12. When thus assembled the various parts are in the position illustrated in Fig. V, and the form of the inner and outer bearing members is such as to prevent the anti-friction elements from becoming displaced or escaping from the bearing.

The next step in forming the completed bearing is to force the free end portion 28 of the inner tubular member 12 outwardly in such a manner as to form an outwardly extending annular flange lying within the groove 14 formed in the surface of the second inner bearing member, and similar in all respects to the outwardly extending annular flange 13 previously described. The outwardly extending portions 3 and 4 of the casing members are then forced inwardly into contact with the outer inclined surfaces of the outer bearing members whereby the outer bearing members are securely held in position relative to the remaining elements of the anti-friction bearing and the parts are retained in proper position relative to each other. It will be observed that the inclination of the outer surfaces of the outer bearing members is at a very slight angle to the axis of the bearing, but is sufficient so that when the outwardly extending overlying portions of the casing are pressed into engagement therewith, the outer bearing members will be securely retained in position. When the outwardly extending cylindrical portions of the casing member are forced into engagement with the inclined outer surfaces of the outer bearing members, the central transverse portion of the casing member will project slightly above the outer transverse edges thereof, and to give a true cylindrical outer surface to the casing member, the exterior portion thereof is ground slightly in such a manner as to reduce the central portion thereof, and give the same a true cylindrical surface. It will be understood that the particular form of casing member employed herewith is particularly applicable in connection with bearings of this character for the purpose of retaining the elements thereof in position relative to each other and is so formed as to securely retain the outer bearing members in proper position.

While I have shown and described in considerable detail a specific embodiment of my invention, it is to be understood that this showing and description is illustrative only, and for the purpose of rendering my invention more clear, and that I do not regard the invention as limited to the details of construction illustrated or described, nor any of them, except in so far as I have included such limitations within the terms of the following claims, in which it is my intention to claim all novelty inherent in my invention broadly as well as specifically.

What I claim as new and desire to secure by Letters Patent is:

1. The method of making a casing of the class described comprising forming an annular depression in a cylindrical blank, forcing the outwardly extending cylindrical portions of the blank into proximity with each other, and flattening the side edges of the depressed portion.

2. The method of forming a casing of the class described comprising forming an annular depression substantially centrally of a cylindrical blank, and forcing the outwardly extending cylindrical portions of the blank inwardly towards the depressed portion to bring the side walls of the depressed portion into proximity with each other.

3. The method of making a casing of the class described comprising forming an annular depression in a cylindrical blank, forcing the outwardly extending cylindrical portions of the blank inwardly towards the depressed portion to bring the side walls of the depressed portion into proximity with each other, and flattening the outer faces of the depressed portion.

4. The method of making a bearing casing comprising forming an annular depression substantially centrally of a cylindrical blank, forcing the side walls of the depressed portion into proximity to each other, and flattening the outer faces of the side walls.

5. A bearing casing provided with an annular depressed portion positioned substantially centrally thereof the side walls of the depressed portion contacting with each other throughout a portion of their extent, and cylindrical portions extending outwardly in opposite directions from the annular depressed portion.

6. A bearing casing having a portion thereof forced inwardly in such a manner that the side walls of the inwardly extending portions have their inner surfaces in contact with each other, the outer side walls of said portions providing supporting surfaces, and cylindrical portions extending outwardly in opposite directions from the inwardly extending portions thereof.

7. A bearing casing provided with an annular depressed portion positioned substantially centrally thereof, and cylindrical portions extending in opposite directions from the annular depressed portion, the part of the cylindrical portion nearest the annular depression being relatively thinner than the outer end thereof.

8. In an anti-friction bearing, an inner bearing, an outer bearing comprising a pair of outer bearing members having outwardly inclined sides, anti-friction elements interposed between the inner and outer bearings, and a casing provided with a depressed portion, the portions of the casing in both sides of depressed portions being relatively thinner than the outer portions of the casings, the outer portions of the casing being bent downwardly on the inclined sides of the outer bearing members.

9. A bearing casing provided with an annular depressed portion positioned substantially centrally thereof the outer side walls of the depressed portion being flattened to form parallel abutment faces, and cylindrical portions extending outwardly in opposite directions from the depressed portion thereof.

In testimony whereof, I affix my signature.

HARFORD C. KNOWLES.